US012691372B2

(12) United States Patent
Webb

(10) Patent No.: US 12,691,372 B2
(45) Date of Patent: Jul. 28, 2026

(54) LIGHT-UP SCORER FOR A GAME TABLE

(71) Applicant: Indian Industries, Inc., Evansville, IN (US)

(72) Inventor: Daniel L. Webb, Newburgh, IN (US)

(73) Assignee: Indian Industries, Inc., Evansville, IN (US)

(*) Notice: Subject to any disclaimer, the term of this patent is extended or adjusted under 35 U.S.C. 154(b) by 423 days.

(21) Appl. No.: 18/497,321

(22) Filed: Oct. 30, 2023

(65) Prior Publication Data

US 2025/0135328 A1 May 1, 2025

(51) Int. Cl.
*A63F 11/00* (2006.01)
*F21V 33/00* (2006.01)

(52) U.S. Cl.
CPC ........ *A63F 11/0051* (2013.01); *F21V 33/008* (2013.01)

(58) Field of Classification Search
CPC .. A63F 11/0051; F21V 33/008; F21V 21/005; F21S 2/005
See application file for complete search history.

(56) References Cited

U.S. PATENT DOCUMENTS 2,872,742 A * 2/1959 Schott .................... G09B 19/02 434/203
3,484,984 A * 12/1969 Fischer ................ A63H 33/042 446/91
4,475,226 A * 10/1984 Greenberg ............... H04R 3/12 362/370
5,334,026 A * 8/1994 Ylitalo ..................... G06C 1/00 434/207
D417,405 S * 12/1999 Tsai ............................ D10/46.1
6,991,231 B1 1/2006 Tien
7,708,615 B2 * 5/2010 Munch ................. A63H 33/042 446/484
8,376,870 B2 * 2/2013 Chung ...................... A63F 7/22 473/10
9,521,713 B2 12/2016 Niebert et al.
9,900,961 B2 2/2018 Griffiths et al.
10,531,542 B2 1/2020 Rodinger et al.
(Continued)

FOREIGN PATENT DOCUMENTS

CN 110319374 A 10/2019
DE 202020100248 U1 3/2020
WO 2008052316 A1 5/2008

*Primary Examiner* — Kristina M Deherrera
*Assistant Examiner* — Tania Courson
(74) *Attorney, Agent, or Firm* — Woodard, Emhardt, Henry, Reeves & Wagner, LLP

(57) ABSTRACT

A scorer includes a frame and a plurality of blocks configured to slide between a first end and a second end of the frame. The frame includes a rail that supports the blocks to slide between the first end and the second end of the frame. The frame includes a base on the first end that is configured to electrically connect to the blocks. Each block is configured to contact and electrically connect to a neighboring block and/or the base. The blocks include a light that is configured to illuminate when the block is supplied power. When each block electrically connects to the base, the base supplies power to that block and the light illuminates the block. The blocks optionally include magnets that are configured to mechanically couple the blocks together when a user slides the blocks into contact.

20 Claims, 6 Drawing Sheets

(56) References Cited

U.S. PATENT DOCUMENTS

| | | | | |
|---|---|---|---|---|
| 10,746,384 | B2 | 8/2020 | Stucchi | |
| 11,167,204 | B1 * | 11/2021 | Farley | F21V 23/04 |
| 11,207,607 | B2 * | 12/2021 | Binder | H01R 24/64 |
| 11,376,492 | B2 | 7/2022 | Lu | |
| 11,500,409 | B2 * | 11/2022 | Son | G06C 1/00 |
| 12,464,627 | B2 * | 11/2025 | Cutt | H05B 47/19 |
| 2005/0130106 | A1 * | 6/2005 | Ho | G09B 5/14<br>434/201 |
| 2015/0151197 | A1 | 6/2015 | Cyphers, Sr. | |
| 2018/0202643 | A1 * | 7/2018 | Wang | F21S 4/28 |
| 2022/0307661 | A1 | 9/2022 | Hierzer | |

* cited by examiner

LIGHT-UP SCORER FOR A GAME TABLE

FIELD OF THE INVENTION

The present disclosure deals with scoring systems for games.

BACKGROUND

Game tables are used to play a variety of games, such as foosball (e.g., table soccer), air hockey, billiards, table tennis, bumper pool, shuffleboard, and/or other games. Some game tables utilize a scoring system to display users' scores as they play the game. For example, a game table can include a sliding scorer. Traditional sliding scorers typically include beads or other pieces that slide along a rail or track, and a user can slide pieces together on one side to indicate the score. Some sliding scorers may display the score unclearly, may have low visibility, and/or may display a score ineffectively in another way. For example, while playing a game, it may be difficult or inconvenient for a user to manually count the pieces that indicate the score, to identify which pieces indicate the score, and/or otherwise quickly read the score. The user may easily lose track of the score using such a sliding scorer.

Game tables often involve moving parts and/or require the user to hit, push, and/or otherwise moves objects in the game. During a game, the user may accidentally bump, tilt, and/or shake the scorer or the game table. Such movement can cause pieces on a manual the scorer to slide out of place. For example, over the course of a game, pieces of the scorer may become jostled out of place so as to indicate an incorrect score or not clearly indicate any score, or the user may lose track of which pieces of the sliding scorer indicate the score. Additionally, the number of pieces on a sliding scorer limits the score that can be displayed, which can limit the length of the game and/or the game table's overall usage.

Thus, there is a need for improvement in this field.

SUMMARY

Certain embodiments include a scorer system for a game table. The scorer system includes a frame. The frame generally includes a rail and a base. The base is positioned on a first end of the rail, and the frame is configured to mount to the game table.

The scorer system generally includes a plurality of blocks configured to slide along the rail. Each block includes a light that is configured to selectively illuminate. Each block is configured to electrically connect to another block when that block contacts the other block. Each block can optionally include a magnet. The magnet on one block is configured to mechanically couple to the magnet on another block when that block contacts the other block. A first block of the plurality of blocks is configured to electrically connect to the base when contacting the base. The base can optionally include a magnet, and the magnet on the first block can mechanically couple to the magnet on the base when the first block contacts the base.

The base is configured to supply power to the first block when the first block contacts and electrically connects to the base. Each sequential block is configured to electrically connect to the base through one or more blocks including the first block when each sequential block electrically connects to one of the blocks already electrically connected to the base. When each sequential block electrically connects to the base, the base is configured to supply power to that block. The light in each block is configured to illuminate when the base supplies power to that block.

In some embodiments, each block can include a first magnet on a first side and a second magnet on a second side. The first magnet on one block is configured to couple to the second magnet on another block when the first side of that block contacts the second side of the other block. In one example, the base can include a magnet that is configured to couple to the first magnet on the first block when the first block contacts the base. Additionally, the frame can include a stopper on a second end that is positioned opposite the first end across the rail. The stopper is configured to limit the movement of a last block of the plurality of blocks. In one example, the stopper includes a magnet that is configured to couple to the second magnet on the last block when the last block contacts the stopper.

In some embodiments, each block is configured to illuminate in multiple colors. For example, the blocks can be configured to change the color of illumination to indicate a score greater than the number of said blocks. In another example, the blocks can be configured to change color of illumination more than once so as to indicate a range of scores at least three times the number of blocks. In yet another example, the blocks can be configured illuminate in a pattern. The blocks can include a housing that encloses the light. A portion of the housing can be translucent so as to allow light to pass through the housing. In one instance, the housing can be textured so as to diffuse illumination from the light. The housing on each block can optionally include indicia. In one example, the light in each block is configured to illuminate the indicia when the block receives power.

In some embodiments, each block can include pins on a first side and sockets on a second side. The pins on one block are configured to electrically connect to the sockets on another block when the first side of that block abuts the second side of the other block. Optionally, the base can include sockets configured to electrically connect to the pins on the first block. The pins on the first block are configured to nest in the sockets when the first block abuts the base. The base can further include a port that is configured to electrically connect the base to an external power source. Additionally, each block can define a recess on the first side, and the first magnet can be positioned within the recess. The recess on one block can be configured to receive the second magnet on another block when the first side of that block abuts the second side of the other block.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
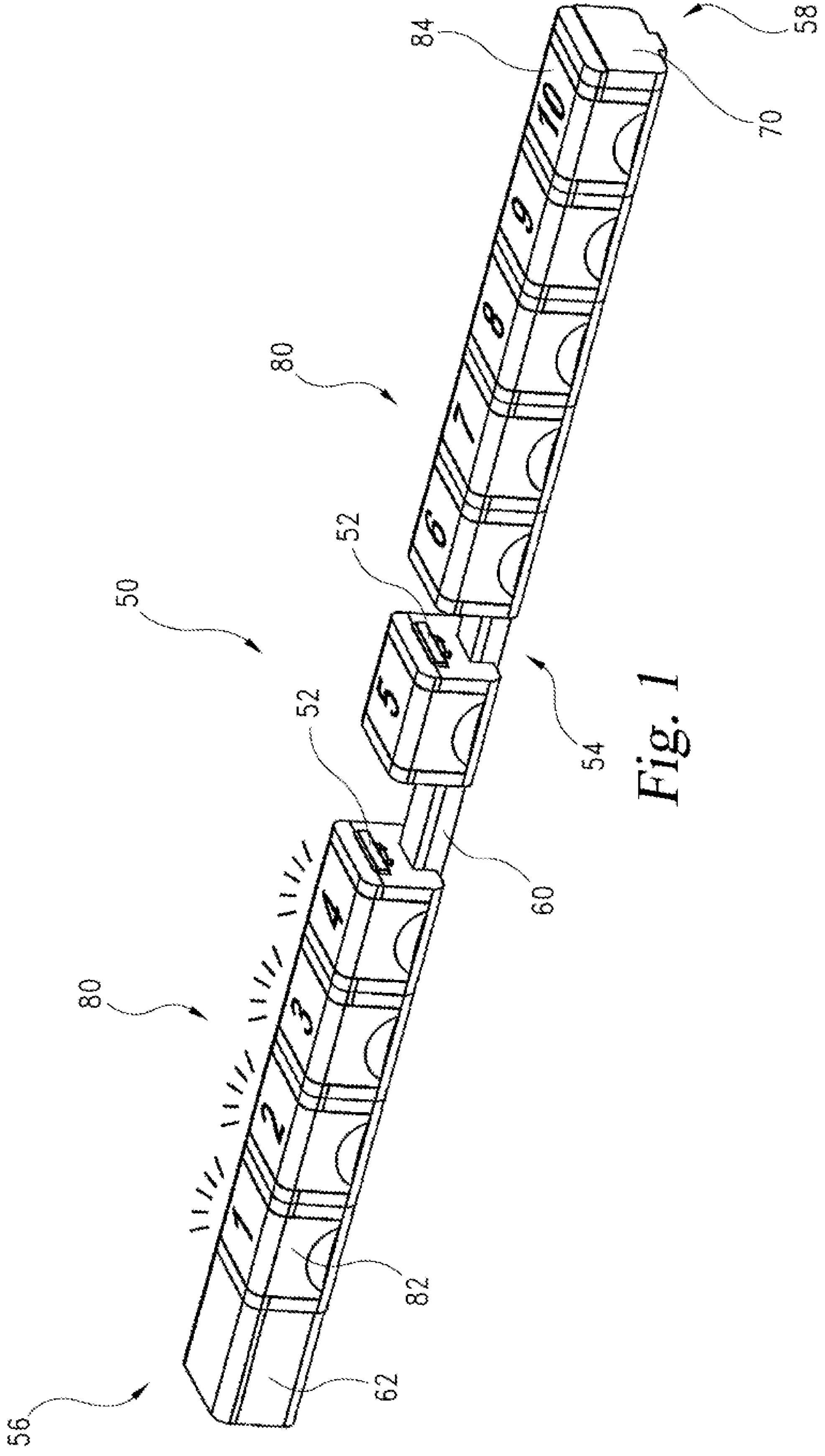
FIG. 1 is a perspective view of a scorer.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Directional terms, such as forward, rearward, top, bottom, etc., are used in this description with reference to the specific embodiment shown and used for purposes of clarity. It should be recognized that these terms are not meant to be limiting.

Referring to FIG. 1, a light-up scorer 50 can be used to keep score for a game. For example, the scorer 50 can be used with a game table for air hockey, table hockey, foosball (e.g., table soccer), billiards, bumper pool, table tennis, shuffleboard, and/or another game or game table. The scorer 50 may be mounted to the game table. For instance, a user may mount a scorer 50 on each end of the game table to keep scores for two players and/or teams. Alternately, the scorer may be mounted near a game table.

The scorer 50 includes a frame 54 and blocks 80. The frame 54 is configured to support the blocks 80. The blocks 80 are movably coupled to the frame 54 so as to slide between the first end 56 and second end 58 of frame 54. A user can slide one or more of the blocks 80 to the first end 56 to indicate a score. The blocks 80 that indicate the score are configured to illuminate.

When one or more of the blocks 80 are positioned on the first end 56, those blocks 80 can electrically connect to a power source so as to turn on a light in the blocks 80. For example, each block 80 can include an LED that turns on when the block 80 electrically connects to a power source. The blocks 80 can further include indicia, such as numbers, logos, and/or other designs. In the illustrated example, the blocks 80 are marked sequentially with numbers.

The scorer 50 typically includes multiple magnets 52. In the illustrated embodiment, both the frame 54 and the blocks 80 include magnets 52. The magnets 52 are configured to mechanically couple two neighboring blocks 80 when those blocks 80 contact each other. Similarly, the magnets 52 are configured to couple one block 80 to a portion of the frame 54 when that block 80 contacts the portion of the frame 54. The magnets 52 can include permanent magnets and/or electromagnets. Generally, the magnets 52 are arranged in pairs such that the north pole of one magnet 52 is positioned towards the south pole of another magnet 52. As should be appreciated, the magnets 52 could be arranged such that one or more magnets 52 are configured to couple to a ferromagnetic material that does not produce its own magnetic field.

As illustrated, the frame 54 generally includes a rail 60, a base 62, and a stopper 70. The rail 60 extends between the first end 56 and the second end 58 of the frame 54. The blocks 80 are configured to slide along rail 60. The base 62 is positioned on the first end 56 and is configured to limit movement of the blocks 80 towards first end 56. A user can selectively electrically connect the base 62 and the blocks 80 by sliding the blocks 80 into contact with the base 62 or a block 80 connected to the base 62. The base 62 can electrically connect to the blocks 80 either directly or indirectly. In a direct electrical connection, the base 62 can contact the block 80 to establish an electrically conductive path between the base 62 and the block 80. In an indirect electrical connection, one or more blocks 80 can sequentially contact one another and the base 62 to establish an electrically conductive path from the base 62 to the block 80 through one or more other blocks 80. When one or more blocks 80 electrically connect to the base 62, the base 62 is configured to supply power to those blocks 80. Across the rail 60, the stopper 70 is positioned on the second end 58 and is configured to limit movement of the blocks 80 towards the second end 58.

The set of blocks 80 includes a first block 82 and a last block 84. The first block 82 is positioned closer to the first end 56 of the frame 54 than the rest of the blocks 80. In the illustrated example, the first block 82 is marked with a “1” symbol and sequential blocks 80 are marked with the corresponding sequential number symbols. When a user slides the first block 82 towards the first end 56, the first block 82 is configured to contact and electrically connect to the base 62. The base 62 is configured to supply power to the first block 82 when the first block 82 electrically connects to the base 62. A user can slide blocks 80 sequentially toward the first block 82. When the subsequent block 80 contacts and electrically connects to the first block 82, the base 62 electrically connects to and supplies power to the subsequent block 80 through the first block 82. When any subsequent block 80 electrically connects to any block 80 that receives power, such as the first block 82 or another block 80, the subsequent block 80 receives power. In the FIG. 1 example, the blocks 80 marked “1” through “4” are electrically connected to the base 62, and the base 62 supplies power to those blocks 80 such that those blocks 80 illuminate. Generally, each block 80 is configured to illuminate when power is supplied to that block 80. In a generic sliding scorer, a user can slide blocks to indicate the score. However, in the light-up scorer 50, the blocks 80 are configured to electrically connect to the base 62 and to illuminate when the user slides the blocks 80 to display a score.

The last block 84 is positioned furthest toward the second side 58 of frame 54 compared to the rest of the blocks 80. Stopper 70 is configured to limit movement of the last block 84 toward the second side 58. In the illustrated embodiment, the scorer 50 includes ten blocks 80 and the last block 84 is marked with a “10” symbol. As shown in the FIG. 1 example, the blocks 80 marked “6” through “10” abut one another and are positioned against the stopper 70. In one example, the scorer 50 can indicate a score up to ten as the user slides a corresponding number of blocks 80 towards the first side 56. In another example, the scorer 50 can indicate a score beyond ten by changing the color of illumination after the last block 84 electrically connects to the base 62 and illuminates. For instance, the blocks 80 can illuminate in red to indicate a score up to ten, and after a user resets the positions of the blocks 80, the blocks 80 can illuminate in blue to indicate a score from eleven up to twenty.

Figure 2:
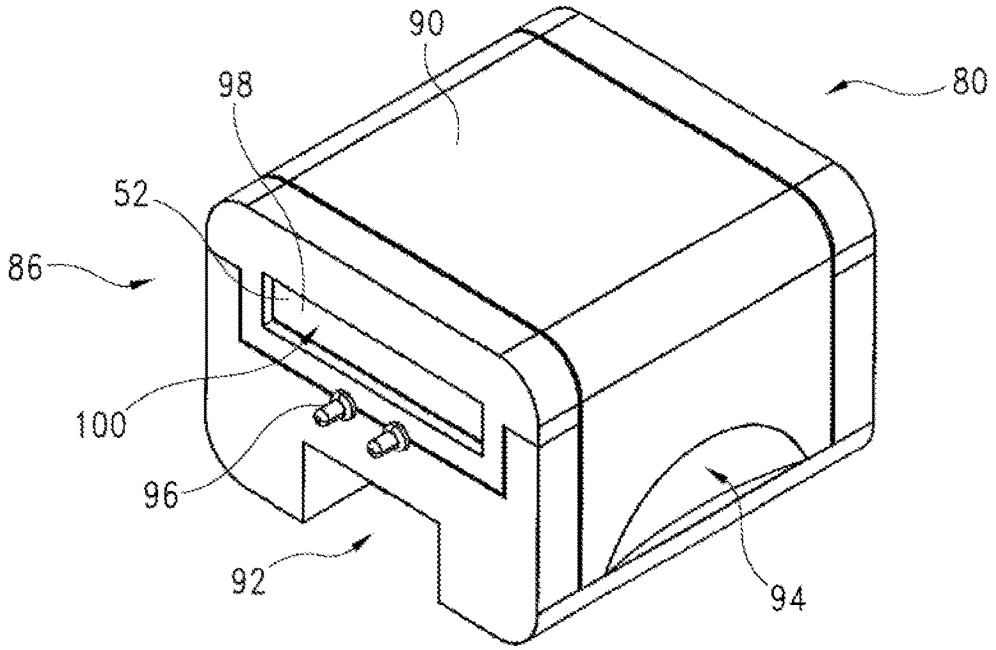
FIG. 2 is a front perspective view of a block, a component of the FIG. 1 scorer.
Figure 3:
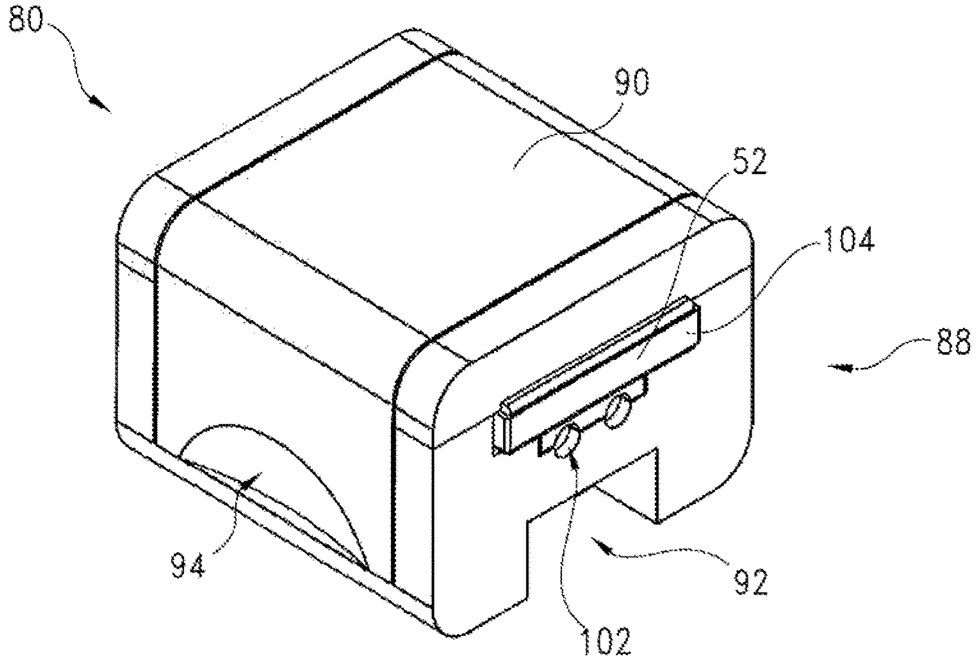
FIG. 3 is a rear perspective view of the FIG. 2 block.

Referring to FIGS. 2 and 3, the block 80 is illustrated. Each block 80 in the scorer 50 could include any kind of indicia, such as unique designs among other blocks 80, the same design as other blocks 80, and/or sequential markers consistent with the other blocks 80. For illustration purposes, the block 80 in FIGS. 2 and 3 is blank and does not include the indicia as shown in FIG. 1. Each block 80 generally includes a housing 90, a pin 96, a socket 102, and magnets 52. As shown, pins 96 and a first magnet 98 are positioned on a first side 86 of the block 80. Sockets 102 and a second magnet 104 are positioned on a second side 88 of the block 80.

The housing 90 forms the structure of the blocks 80 and is typically made of a rigid material. For example, the housing 90 can be made of hard plastic. A portion of the housing 90 is translucent. The translucent portion can be partially opaque or fully transparent so as to allow at least some light to pass through the housing 90 from the interior of the block 80. The housing 90 can be formed in a variety of ways, such as casting with a mold and/or 3D printing as examples.

Further, the housing 90 can be formed from more than one piece that assemble together. For example, the housing 90 can include multiple pieces that are shaped to couple together and/or configured to couple together using a fastener.

The housing 90 defines a slot 92 from the first side 86 to the second side 88. The slot 92 is configured to receive the rail 60. The slot 92 is shaped such that housing 90 extends around the lateral sides of rail 60 when the blocks 80 are coupled to the rail 60. By extending around the rail 60, the housing 90 provides stability for the block 80 as a user slides the block 80 along the rail 60. The shape of the slot 92 is generally consistent from the first side 86 to the second side 88 so as to allow the block 80 to slide along the rail 60. The housing 90 optionally defines divots 94 on the lateral sides of the block 80. The divots 94 extend slightly inward on the housing 90 and support a user to grip the block 80. For example, the divots 94 can provide a space for a user's fingers to grip the block 80 as the user slides the block 80.

As shown in FIG. 2, the pins 96 extend from the block 80 on the first side 86. The pins 96 are configured to electrically connect the block 80 to a neighboring block 80. Specifically, the pins 96 are configured to electrically connect to the sockets 102 on another block 80 when a user slides the blocks 80 into contact. On the first block 82, the pins 96 are configured to electrically connect the first block 82 to the base 62 on the frame 54. The pins 96 are made of an electrically conductive material, such as copper or aluminum. In the illustrated embodiment, the pins 96 are generally cylindrical in shape. In another embodiment, the pins 96 can be hook- and/or latch-shaped so as to mechanically couple to the sockets 102 on another block 80.

As shown in FIG. 3, the sockets 102 provide a space to receive the pins 96 on the second side 88. The sockets 96 are configured to electrically connect to the pins 96 on another block 80 when a user slides the blocks 80 into contact. In one example, the sockets 102 on the last block 84 are not configured to electrically connect to any pins 96. In another example, the last block 84 does not include sockets 102. The sockets 102 are made of an electrically conductive material, such as copper or aluminum. In one embodiment, the sockets 102 are shaped to mirror the shape of the pins 96 on another block 80. In another embodiment, the sockets 102 are configured to mechanically couple to the pins 96 on another block 80 using a clip and/or another mechanism. When two neighboring blocks 80 contact each other and the pins 96 connect to the sockets 102, the pins 96 on one block 80 are positioned in the sockets 102 on the other block 80 such that first side 86 of one block 80 can contact and abut the second side 88 of the other block 80.

In the illustrated embodiment, each block 80 includes two pins 96 and two sockets 102. In one arrangement, one pin 96 and socket 102 are configured to carry a positive voltage (i.e., 3 or 5 volts) relative to ground, and the other pin 96 and socket 102 are configured to carry a ground voltage. Using this arrangement, the blocks 80 can be electrically connected in parallel such that a lighting element receives the same voltage in each block 80. In an alternate embodiment, each block 80 can include one pin 96 and one socket 102, and the conduction path on each block can be completed through a conductor on the rail 60. In yet another embodiment, each block 80 can include more than two pins 96 and two sockets 96. For example, each block 80 can include additional pins 96 and sockets 96 that are configured to carry one or more data signals between the blocks 80. As should be appreciated, the blocks 80 could use a variety of conductor shapes in addition to or in place of pins and sockets, such as electrically conductive pads.

The first magnet 98 on first side 86 is configured to couple to the second magnet 104 on another block 80. By coupling the blocks 80 together, the first and second magnets 98 and 104 maintain contact between the sockets 102 on one block 80 and the pins 96 on another block 80 so as to maintain the electrical connection between the blocks 80. On the first block 82, the first magnet 98 is configured to couple to a magnet 52 on base 62. The housing 90 optionally defines a recess 100 on the first side 86. The first magnet 98 can be positioned in the recess 100. The recess 100 is configured to receive a portion of the second magnet 104 when the first and second magnets 98 and 104 on two blocks 80 couple to one another. By receiving second magnet 104 in the recess 100, the blocks 80 can remain aligned when the first and second magnets 98 and 104 couple, and the blocks 80 can abut one another.

The second magnet 104 may protrude from the second side 88. When two neighboring blocks 80 contact each other and the second magnet 104 couples to the first magnet 98, the second magnet 104 on one block 80 is positioned in the recess 100 on the other block 80 such that first side 86 of one block 80 contacts the second side 88 of the other block 80. The first and second magnets 98 and 104 are aligned in the same direction such that the magnet fields are oriented in the same direction and the magnetic force is attractive between the magnets 98 and 104. For instance, the north pole of the first magnet 98 can be positioned toward the south pole of the second magnet 104. Alternatively, one of the first and second magnets 98 and 104 could be replaced with a ferromagnetic material that does not produce a noticeable magnetic field, such as piece of iron. As should be appreciated, the magnets 98 and 104 could be aligned flush with the sides 86 and 88 of the blocks 80 so as to allow the blocks 80 to abut one another. Additionally, the blocks 80 could use another mechanism to mechanically couple together in addition or as an alternative to the magnets 52.

Figure 4:
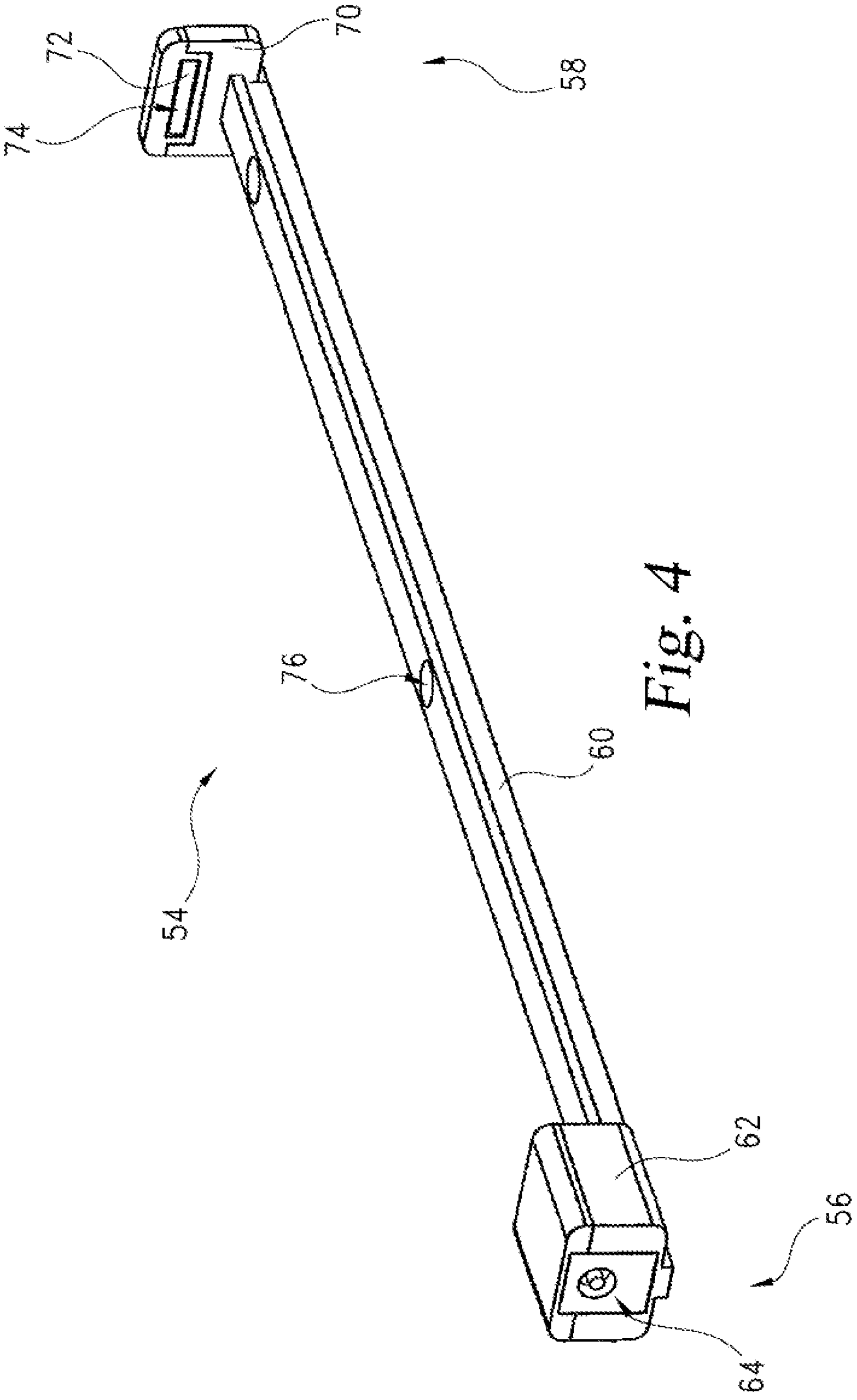
FIG. 4 is a front perspective view of a frame, a component of the FIG. 1 scorer.
Figure 5:
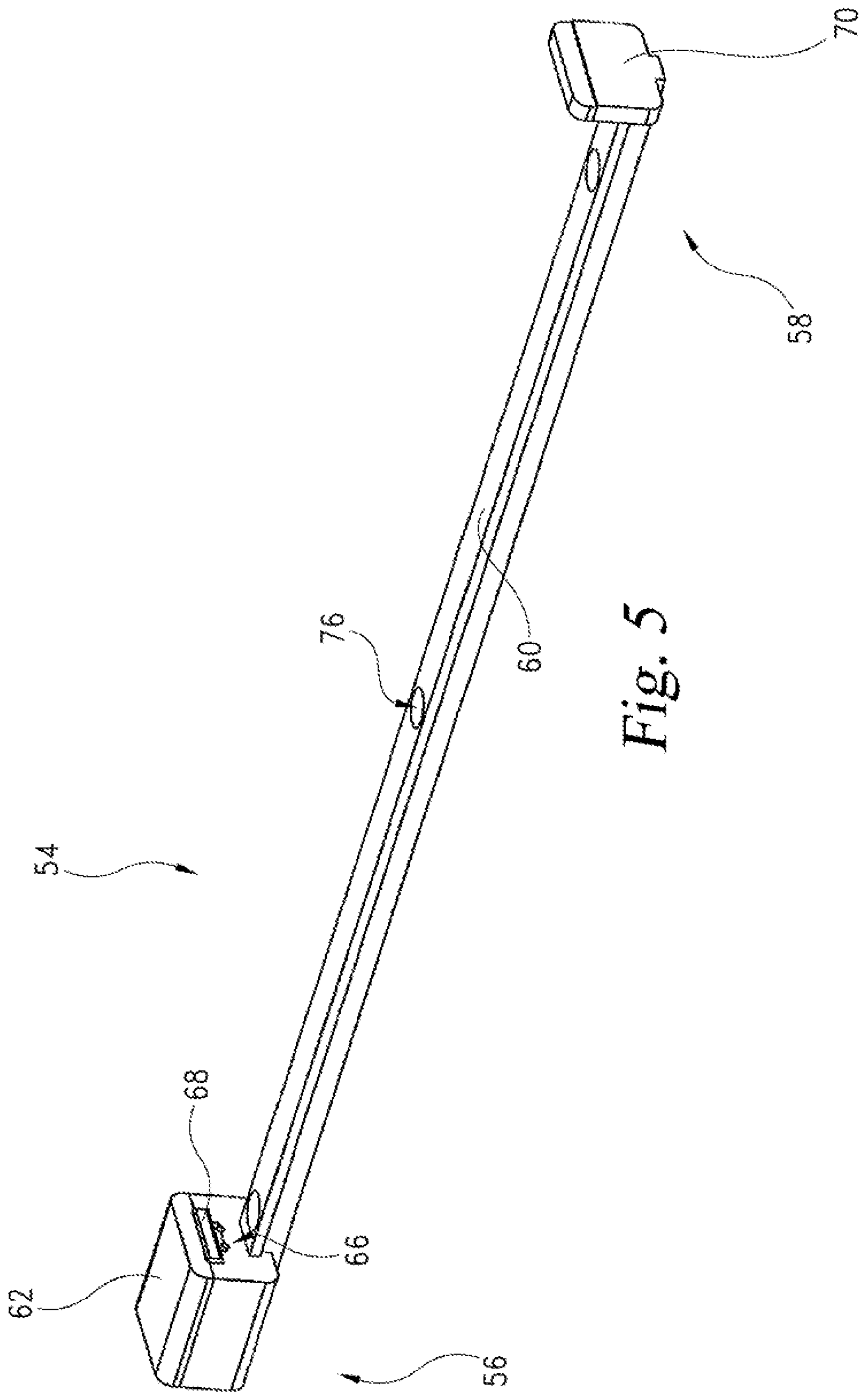
FIG. 5 is a rear perspective view of the FIG. 4 frame.

Referring to FIGS. 4 and 5, the base 62 of the frame 54 generally includes a port 64, sockets 66, and a base magnet 68. The port 64 is configured to receive an electrical conductor, such as a cable, to electrically connect to the base 62 to a power source. By connecting the base 62 to a power source, the port 64 supports the base 62 to supply power to lighting elements in the blocks 80. The port 64 can allow the base 62 to electrically connect to the power grid through an outlet, to a battery pack, to a power source incorporated into the game table, and/or to another power source. Alternately, the base 62 can optionally include a power source. For example, the base 62 can include a rechargeable and/or disposable battery or batteries. In one example, the port 64 can be used to recharge a battery in the base 62. In another example, the base 62 can include a power source but not a port 64. The base 62 optionally can include a switch and/or button to turn the base 62 on and off and/or to connect and disconnect the base 62 to an external power source.

The sockets 66 face second end 58 of frame 54 and are configured to receive the pins 96 on the first block 82. The sockets 66 are configured to electrically connect to the pins

96 and transfer power to the blocks 80. The sockets 66 are electrically connected to the port 64 and/or a power source and are configured to connect the pins 96 to the port 64 and/or the power source. In one example, the sockets 66 can be directly electrically connected to the port 64 and/or the power source. In another example, the base 62 can include one or more power converters, fuses, microcontrollers, and/or other components that electrically connect the sockets 66 to the port 64 and/or power source. The sockets 66 are generally shaped to mirror the shape of the pins 96 on the blocks 80. When the first block 82 contacts the base 62, sockets 66 allow the first block 82 to abut the base 62. In one embodiment, the sockets 66 on the base 62 can be the same shape and/or material as the sockets 102 on the blocks 80. The number and arrangement of the sockets 66 matches the number and arrangement of the pins 96 on the first block 82.

The base magnet 68 is positioned on the same side as the sockets 66. The base magnet 68 is configured to mechanically couple to the first magnet 98 on the first block 82 when a user slides the first block 82 to the base 62. When the first block 82 couples to the base 62, the base magnet 68 extends into the recess 100 on the first block 82 to facilitate aligning the blocks 80 and the base 62 and to allow the first block 82 to abut the base 62. By coupling the first block 82 to the base 62, the base magnet 68 maintains contact between the sockets 66 on the base 62 and the pins 96 on the first block 82 so as to maintain the electrical connection between the base 62 and the first block 82. By maintaining the position of the blocks 80 on the first end 56, the blocks 80 that indicate the score can reliably receive power from the base 62 and illuminate. For example, the base magnet 68 can hold the blocks 80 on the first end 56 in place such that the blocks 80 remain electrically connected to the base 62 if a user accidentally bumps the scorer 50 or tilts the game table. In this way, the base magnet 68 assists the scorer 50 to reliably display the correct score.

On the second end 58, the stopper 70 can include a stopper magnet 72. The stopper magnet 72 is configured to mechanically couple to the second magnet 104 on the last block 84 when the last block 84 is positioned against the stopper 72. By coupling to the last block 84, the stopper magnet 72 is configured to maintain the position of the last block 84 and other blocks 80 mechanically coupled to the last block 84 toward the second end 58 when those blocks 80 are not displaying the score. For example, the stopper magnet 72 prevents the blocks 80 on the second end 58 from sliding to the first end 56 if a user accidentally bumps the scorer 50 or tilts the game table. The stopper magnet 72 assists the scorer 50 to reliably display the correct score.

The stopper 70 optionally defines a recess 74. The stopper magnet 72 can be positioned in the recess 74. The recess 74 is configured to receive the second magnet 104 on the last block 84. When the last block 84 couples to the stopper 70, the second magnet 104 on the last block 84 extends into the recess 74 on the stopper 70 to facilitate aligning the blocks 80 and the stopper 72 and to allow the last block 84 to abut the stopper 70.

The base magnet 68 and the stopper magnet 72 are typically aligned in the same direction as magnets 98 and 104 on the blocks 80 such that the magnetic fields are oriented in the same direction and the magnetic force is attractive. For instance, the north pole of the base magnet 68 can be positioned toward the south pole of the first magnet 98 on the first block 82. Alternatively, one of the base magnet 68 and stopper magnet 72 could be replaced with a ferromagnetic material that does not produce a noticeable magnetic field, such as a piece of iron. As should be appreciated, the base 62 and/or the stopper 70 could use another mechanism to mechanically couple to the blocks 80 in addition or as an alternative to magnets 52.

The rail 60 extends between the base 62 and the stopper 70. The rail 60 may be made of a rigid material to support the blocks 80. For example, the rail 60 can be made of hard plastic, metal, and/or even wood. The rail 60 can be formed in a variety of ways, such as through casting using a mold, 3D printing or machining. In one example, the rail 60 is integrally formed with the base 62 and the stopper 70 to form the frame 54. In another example, the rail 60 is coupled to the base 62 and the stopper 70 using fasteners and/or another mechanism. The rail 60 defines fastener openings 76 along the length of rail 60. The fastener openings 76 are configured to receive a fastener, such as a screw, bolt, and/or nail as examples. A user can mount the scorer 50 to a game table or another structure using fasteners in the fastener openings 76.

Figure 6:
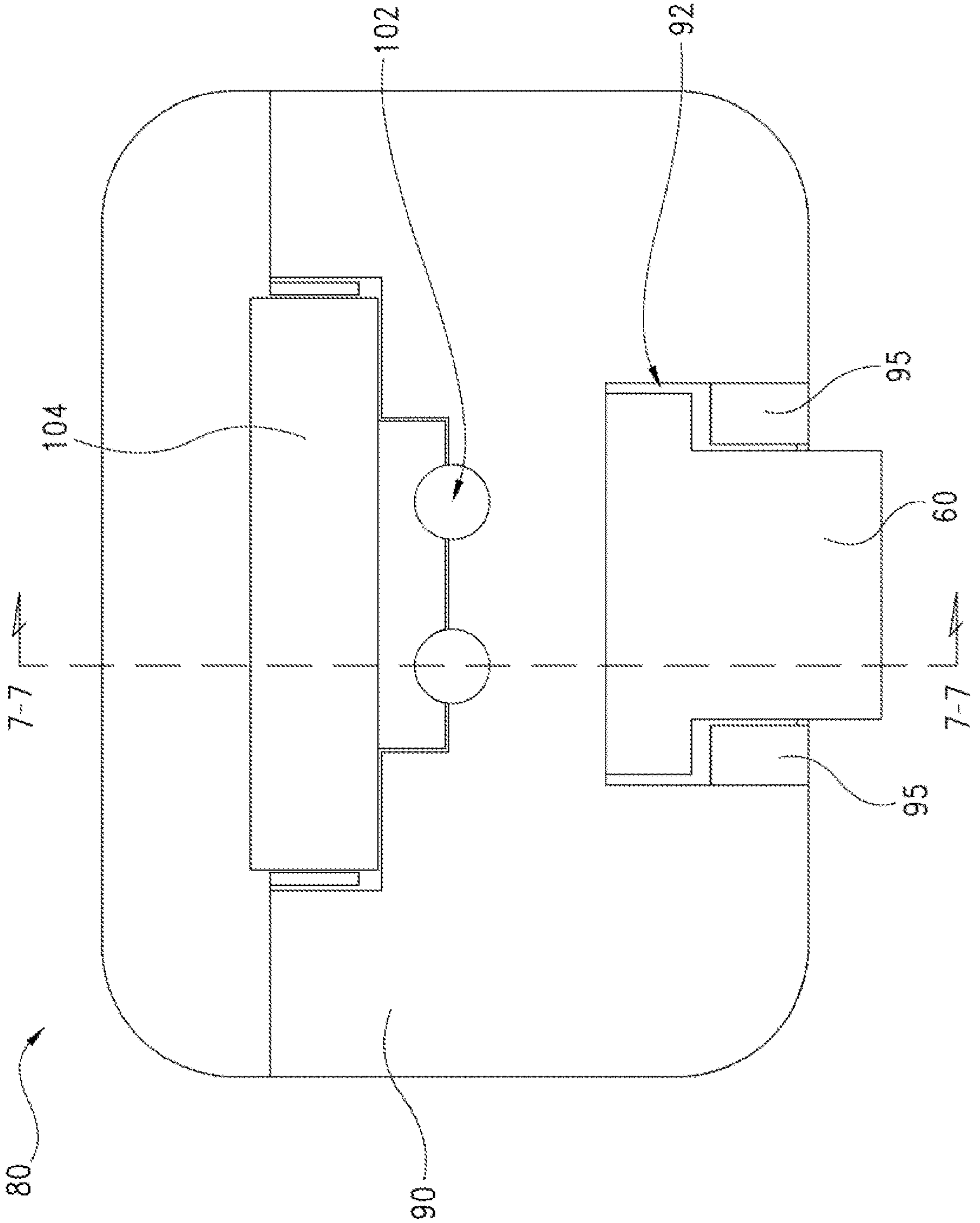
FIG. 6 is a rear elevation view of the FIG. 2 block on a rail, a component of the FIG. 4 frame.

An end view of a block 80 positioned on the rail 60 of frame 54 is shown in FIG. 6. The housing 90 of the block 80 optionally includes tabs 95 that extend into slot 92. When the block 80 is positioned on the rail 60, the tabs 95 extend around a portion of the rail 60. The tabs 95 limit or prevent the block 80 from rising upwards from the rail 60 so as to secure the block 80 on the rail 60. As shown, the rail 60 defines a t-shaped cross-section, and tabs 95 reduce the slot 92 into a similar t-shape.

Figure 7:
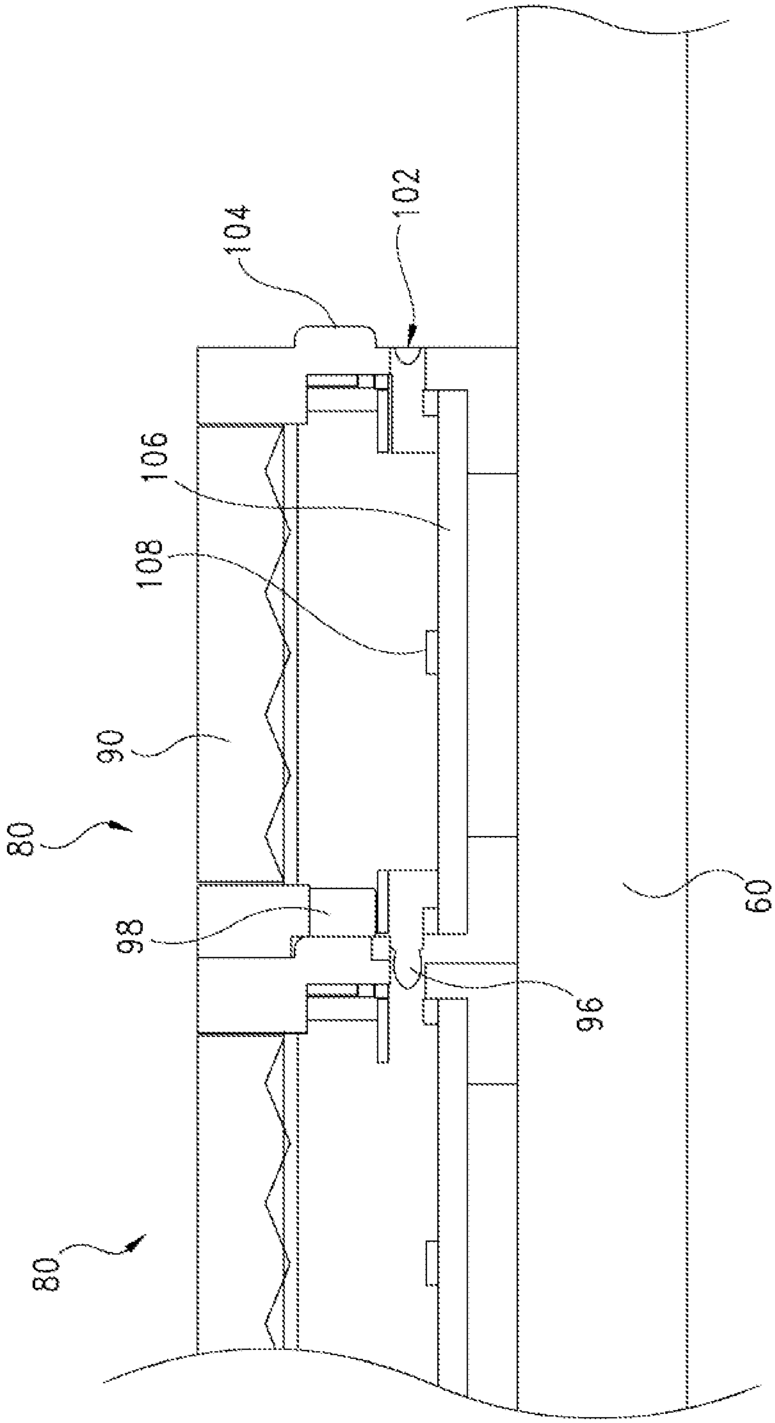
FIG. 7 is a cross-sectional view of the FIG. 1 scorer taken along line 7-7 in FIG. 6.

Referring to FIG. 7, a cross-sectional view of the scorer 50 is illustrated. On the interior of the block 80, each block 80 includes a circuit board 106. The circuit board 106 can be a printed circuit board (PCB) or another type of electrical circuit. The circuit board 106 is electrically connected to the pins 96 and the sockets 102. In one embodiment, the circuit board 106 directly electrically connects one pin 96 to one socket 102. In another embodiment, the circuit board 106 includes a switch, fuse, microcontroller, and/or another component that is electrically connected between the pin 96 and socket 102.

The circuit board 106 includes a light 108. In one embodiment, the light 108 is a light emitting diode (LED). The light 108 is electrically connected to the pins 96 and the sockets 102. In one embodiment, the light 108 is configured to turn on when the block 80 receives power. For example, terminals on the light 108 can be directly connected to the pins 96 of the block 80 such that the light 108 receives power and turns on when the pins 96 electrically connect to the sockets 102 on another block 80 receiving power. By illuminating the light 108 in each block 80 when the block 80 electrically connect to the base 62, the scorer 50 clearly indicates to the user which blocks 80 display the score. The lights 108 can make it easier for a user to read the score on the scorer 50 compared to a traditional sliding scorer.

The light 108 may be configured to illuminate in more than one color. In the illustrated example, the light 108 includes multiple LEDs that are configured to illuminate in multiple colors. The light 108 can include multiple individually-packaged LEDs and/or a combined LED package, such as an RGB LED. The circuit board 106 can include a microcontroller and/or another circuit that controls the color of the light 108. In one example, the light 108 is configured to illuminate in a different color after the score exceeds the number of blocks 80. For instance, in a scorer 50 with ten blocks 80, the light 108 in each block 80 can illuminate in one color until the user had slid all ten blocks 80 to the first end 56 to indicate a score of ten. The user can then reset the position of the blocks 80 to the second end 58, and when the user slides the first block 82 into contact with the base 62, the first block 82 can illuminate in a new color to indicate a score of eleven. When the user sequentially slides blocks 80 to electrically connect to the base 62, the subsequent blocks 80 can illuminate in the new color to indicate corresponding scores of twelve to twenty. Optionally, the user can repeat the process after connecting all the blocks 80 to the base 62, and the lights 108 in the blocks 80 can illuminate in a third color to indicate scores above twenty. By illuminating in different colors, the lights 108 allow the scorer 50 to indicate a larger score than a traditional sliding scorer with the same number of sliding pieces. As should be appreciated, the light 108 could be configured to illuminate in any number of different colors so as to indicate scores up to the number of colors multiplied by the number of blocks 80. Additionally, the light 108 could include another type of lighting element in addition to or as an alternate to the LED, such as fluorescent and/or incandescent lights.

Additionally, the circuit board 106 can control the light 108 in a variety of other ways. The scorer 50 can be programmed to control the light 108 in each block 80. For example, a microcontroller and/or another device in the base 62 and/or on the circuit board 106 in the blocks 80 can be programmed to operate the lights 108. An external computer and/or other device can communicate with the base 62 and/or blocks 80 using a wired connection, such as through the port 64, or using a wireless connection, such as over Bluetooth or Wi-fi. The external device can directly control the scorer 50 and/or can program the scorer 50 to operate the lights 108 in a certain way. In one example, the scorer 50 can be configured to illuminate multiple scorers 50 in different colors to indicate different teams playing the game. In another example, the scorer 50 can be configured to illuminate the lights 108 in a pattern, such as to selectively blink one or more lights 108, illuminate one or more lights 108 in a different color than other lights 108, alternate the color of lights 108 in a sequence, and/or illuminate the lights 108 in another way. The scorer 50 can be configured to change the pattern of the lights 108 when one player wins, when the score exceeds the number of blocks 80, and/or in another scenario. Using the lights 108, the scorer 50 can enhance the user experience by making the score more visible, adding supplemental entertainment to a game, extending the length of a game, and/or in another way. As should be appreciated, the scorer 50 could be configured to operate the lights 108 in any variety of ways.

In the illustrated embodiment, a portion of the housing 90 is textured with a zig-zag pattern. The texture allows the housing 90 to diffuse light emitted by the light 108 and allow the block 80 to illuminate evenly. The textured portion of the housing 90 is generally made from a translucent material. The translucent material can be partially opaque or fully transparent so as to allow at least some light to pass through the housing 90. In one example, a portion of the housing 90 can be made of translucent material, such as acrylic, plastic, and/or even glass. In one embodiment, the housing 90 can form indicia on the blocks 80 using a translucent material to allow the light 108 to illuminate the indicia, such as a logo, a number, text, and/or another design. For instance, numbers on the blocks 80 as shown in FIG. 1 can be formed from translucent material such that the light 108 illuminates the numbers on the blocks 80 when powered. Alternatively, the housing 90 can be translucent and numbers and/or other indicia on the blocks 80 can be opaque. In yet another example, the numbers and/or other indicia can be raised or recessed on the housing 90.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected.

The invention claimed is:

1. A scorer system for a game table, the system comprising:

a scorer configured to indicate a score, the scorer including:

a frame including a rail and a base, wherein said base is positioned on a first end of said rail, and wherein the frame is configured to mount to the game table; and a plurality of blocks configured to slide along said rail, wherein each said block includes a light, wherein each said block is configured to electrically connect to another said block by contacting said other block, and wherein a first block of said blocks is configured to electrically connect to said base by contacting said base;

wherein said base is configured to supply power to said first block when said first block contacts and electrically connects to said base;

wherein each sequential said block is configured to electrically connect to said base through one or more said blocks including said first block when each sequential said block electrically connects to one of said blocks electrically connected to said base;

wherein said base is configured to supply power to each sequential said block when each sequential said block electrically connects to said base, and wherein said light in each said block is configured to illuminate when said base supplies power to said block; and wherein a total number of blocks that are illuminated indicates the score.

2. The scorer system of claim 1, wherein said base includes a port configured to electrically connect said base to an external power source.

3. The scorer system of claim 1, wherein each said block includes pins on a first side and sockets on a second side, wherein said pins on one said block are configured to electrically connect to said sockets on another said block when said first side of said block abuts said second side of other said block.

4. The scorer system of claim 3, wherein said base includes sockets configured to electrically connect to said pins on said first block, and wherein said pins are configured to nest in said sockets when said first block abuts said base.

5. The scorer system of claim 1, wherein each said block is configured to illuminate in multiple colors.

6. The scorer system of claim 5, wherein said blocks are configured to change the color of illumination to indicate a score greater than the number of said blocks.

7. The scorer system of claim 6, wherein said blocks are configured to change color of illumination more than once so as to indicate a range of scores at least three times the number of said blocks.

8. The scorer system of claim 1, wherein said blocks include a housing that encloses said light, and wherein a portion of said housing is translucent so as to allow light to pass through said housing.

9. The scorer system of claim 8, wherein said housing is textured so as to diffuse illumination from said light.

10. The scorer system of claim 8, wherein said housing on each said block includes indicia, and wherein said light in each said block is configured to illuminate said indicia when said block receives power.

11. The scorer system of claim 1, wherein each said block includes a first magnet on a first side and a second magnet on a second side, and wherein said first magnet on one said block is configured to couple to said second magnet on another said block when said first side of said block contacts said second side of other said block.

12. The scorer system of claim 11, wherein said base includes a magnet that is configured to couple to said first magnet on said first block when said first block contacts said base.

13. The scorer system of claim 11, wherein said frame includes a stopper on a second end that is opposite said first end across said rail, and wherein said stopper is configured to limit movement of a last block in said blocks.

14. The scorer system of claim 13, wherein said stopper includes a magnet that is configured to couple to said second magnet on said last block when said last block contacts said stopper.

15. A scorer system for a game table, the system comprising:

a scorer configured to indicate a score, the scorer including:

a frame including a rail and a base, wherein said base is positioned on a first end of said rail, wherein said base includes a magnet, and wherein the frame is configured to mount to the game table; and a plurality of blocks configured to slide along said rail, wherein each said block includes a light and a magnet, wherein each said block is configured to electrically connect to another said block by contacting said other block, and wherein said magnet on each said block is configured to mechanically couple to said magnet on another said block when contacting said other block;

wherein a first block of said blocks is configured to electrically connect to said base by contacting said base, and wherein said magnet on said first block is configured to mechanically couple to said magnet on said base when said first block contacts said base;

wherein said base is configured to supply power to said first block when said first block contacts and electrically connects to said base;

wherein each sequential said block is configured to electrically connect to said base through one or more said blocks including said first block when each sequential said block electrically connects to one of said blocks electrically connected to said base;

wherein said base is configured to supply power to each sequential said block when sequential said block electrically connects to said base, and wherein said light in each said block is configured to illuminate when said base supplies power to said block; and wherein a total number of blocks that are illuminated indicates the score.

16. The scorer system of claim 15, wherein a housing on each said block includes indicia, and wherein said light in each said block is configured to illuminate said indicia when said block receives power.

17. The scorer system of claim 15, wherein each said block includes a first magnet on a first side and a second magnet on a second side, and wherein said first magnet on one said block is configured to couple to said second magnet on another said block when said first side of said block contacts said second side of other said block.

18. The scorer system of claim 17, wherein each said block defines a recess on said first side, wherein said first magnet is positioned within said recess, and wherein said recess on one said block is configured to receive said second magnet on another said block when said first side of said block abuts said second side of other said block.

19. The scorer system of claim 15, wherein each said block is configured to illuminate in multiple colors.

20. The scorer system of claim 19, wherein said blocks are configured to illuminate in a pattern.

* * * * *